Sept. 25, 1928.
D. E. WASHINGTON
1,685,256
SPEED REDUCER
Filed Feb. 20, 1926
2 Sheets-Sheet 1
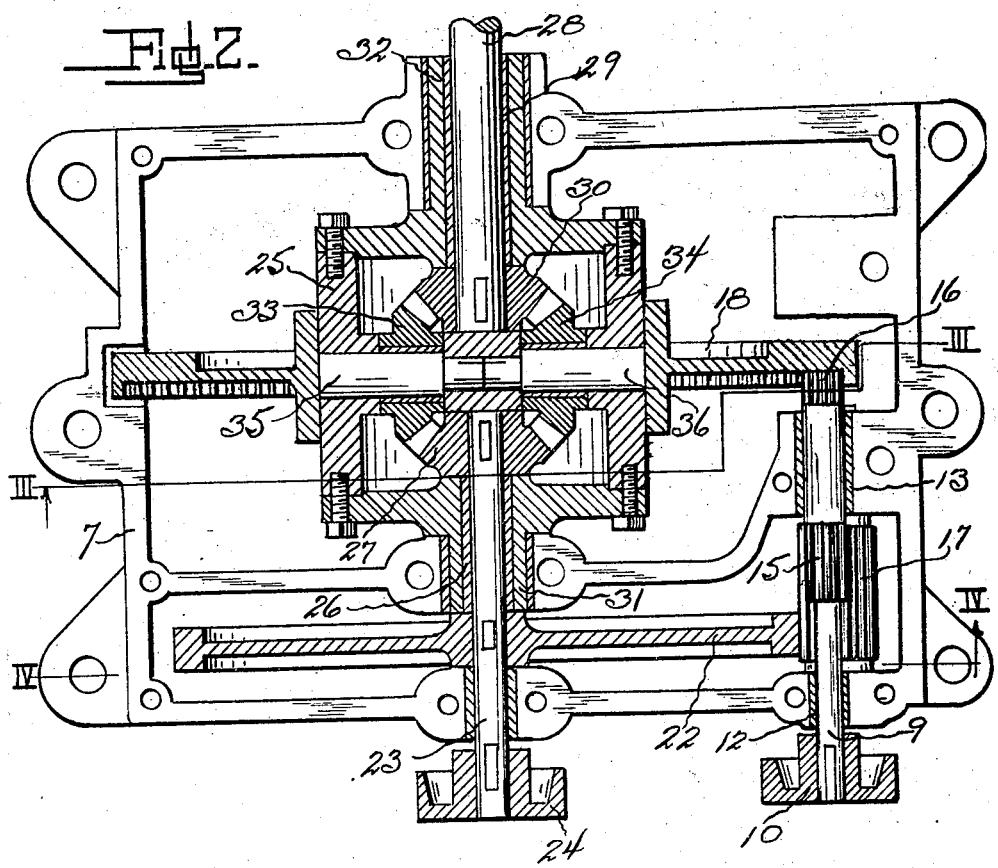
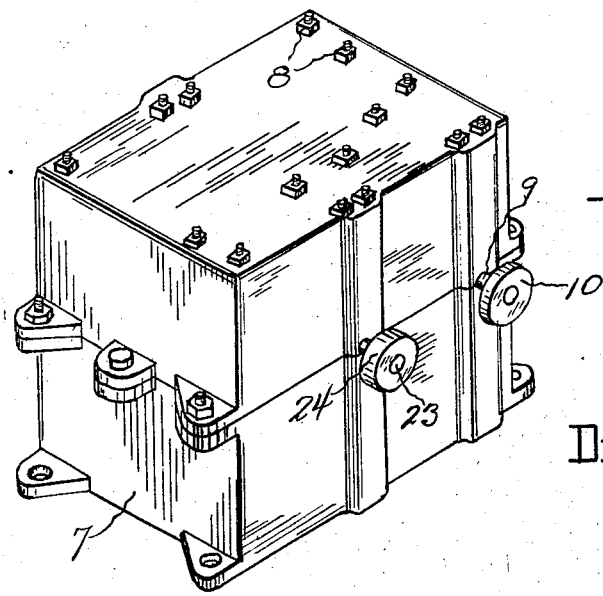
INVENTOR.
Dixon E. Washington
BY
ATTORNEY.

Sept. 25, 1928.
D. E. WASHINGTON
SPEED REDUCER
Filed Feb. 20, 1926
1,685,256
2 Sheets-Sheet 2
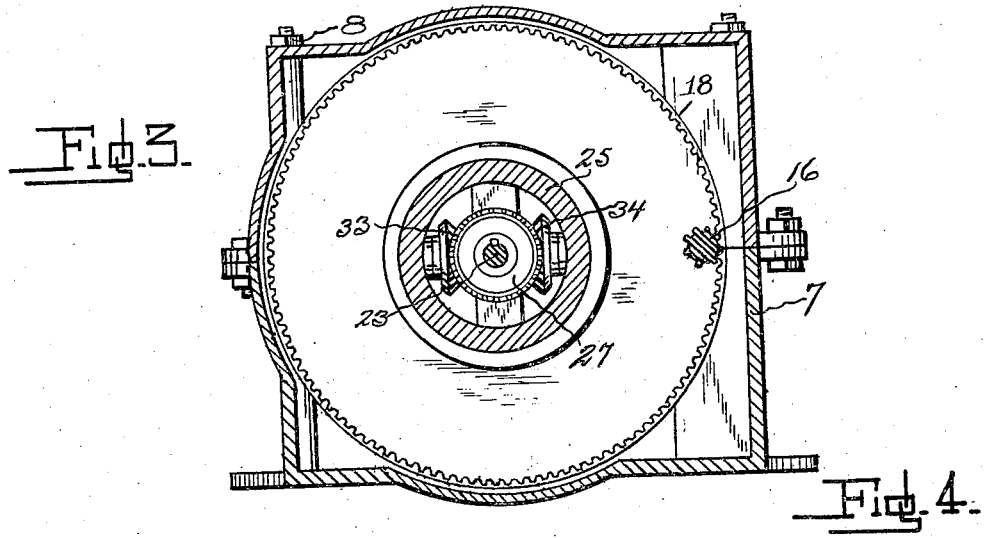
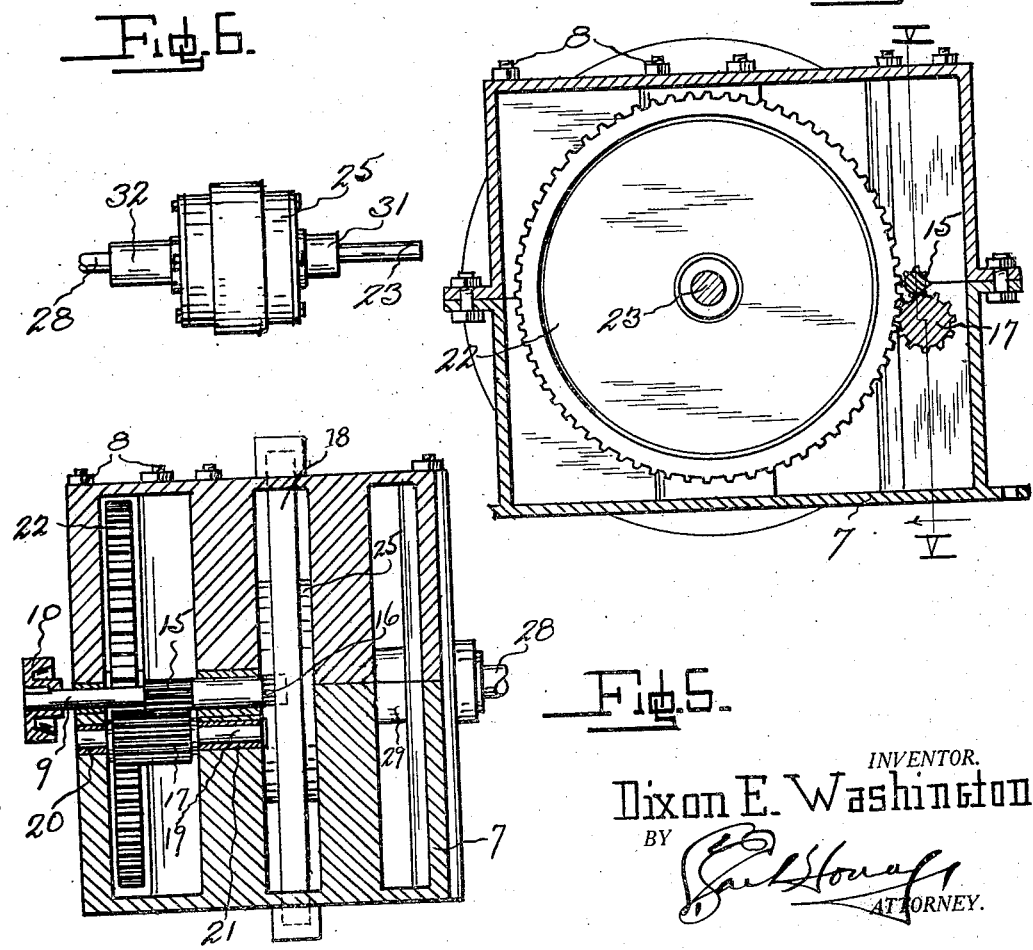
INVENTOR.
Dixon E. Washington
BY
ATTORNEY.

Patented Sept. 25, 1928.

1,685,256

UNITED STATES PATENT OFFICE.

DIXON E. WASHINGTON, OF KANSAS CITY, MISSOURI.

SPEED REDUCER.

Application filed February 20, 1926. Serial No. 89,595.

This invention relates to speed reducers, and has for its primary object the provision of a machine of that character which is extremely simple in structure, performs a maximum amount of work with a minimum number of parts and may be utilized in obtaining any desired speed reduction with the use of but nine gears at all times.

A primary object of the invention is the contemplation of the use of a revolving differential case which houses a pair of master gears, each keyed to a shaft from which may be taken off medium and low speed power.

Another object of the present invention is the provision of a speed reducer which utilizes the difference in speed of two rotated parts thereof to obtain the low speed desired, said low-speed being controlled by the speed ratio of the two elements.

An even further object of this invention is to provide a speed reducer possible of creating low and medium speeds having the take-off shafts rotating at rates of speed controllable by the number of teeth on two main gears rotated by the high speed shaft.

Many minor objects and specific details of novel construction will appear during the course of the detailed specification referring to the accompanying drawings in which:

Figure 1 is a perspective view of a speed reducer made in accordance with this invention.

Fig. 2 is an enlarged horizontal section of the same taken along the meeting line of upper and lower portions of the support.

Fig. 3 is a vertical cross section taken along line III—III of Fig. 2, looking in the direction of the arrow.

Fig. 4 is another vertical cross section taken on line IV—IV of Fig. 2.

Fig. 5 is a vertical section through the machine taken on line V—V of Fig. 4, and, Fig. 6 is a view of the differential unit and internal ring gear, entirely removed from the bearings of the support.

Similar reference characters refer to like parts throughout the several views, and the numeral 7 designates a support of any suitable character which, in this showing, is a combined housing and support adapted to be filled with oil to maintain perfect lubrication. Suitable bearings for all shafts are provided by support 7, as clearly shown in Fig. 2, and the upper half of the support is removably affixed to the lower half by bolts or the like 8. The specific design of the support is not an important feature of the invention, as long as it is capable of maintaining the hereinafter described parts in their proper working relation.

A driving shaft 9 may receive the initial high-speed power through a pulley or analogous means 10. This shaft 9 is securely mounted for rotary motion in bearings 12, and 13, formed by support 7, and carries pinions 15 and 16 which mesh with an idler sprocket pinion 17 and differential internal ring gear 18 respectively, as clearly shown in Figs. 2 and 5.

Idler sprocket pinion 17 is integral with an idler shaft 19, mounted in bearings 20 and 21, slightly below high speed shaft 9, and in a position where sprocket 17 engages intermediate gear 22, keyed to intermediate speed shaft 23, having a power take-off pulley or the like 24.

Intermediate speed shaft 23 enters a differential case 25 through a double bearing 26, and is keyed to intermediate master gear 27 of the differential gear-set within case 25. A low speed shaft 28 is likewise supported in a double bearing 29 and enters case 25 where it is keyed or otherwise rigidly affixed to a low speed master gear 30. Medium and low speed shafts 23 and 28 respectively are rotatably mounted in double bearings 26 and 29 respectively, and are in axial alinement. This construction also permits of the bearings 31 and 32 of case 25 to be rotated in bearings 26 and 29 respectively in the manner illustrated in Fig. 2, thus, casing 25 and shafts 23 and 28 are relatively free to rotate in either direction.

The two master gears 27 and 30, within differential case 25 are in mesh with a pair of idler gears 33 and 34, each of which is supported by case 25 through the intermediacy of stub shafts 35 and 36 respectively. The differential ring gear 18 is rigidly affixed to case 25 and rotates therewith.

The foregoing description of the various elements of the speed reduction device makes clear the specific construction of the particular embodiment shown in the accompanying drawings.

During the description of its operation, the reducer will be set forth in a specific manner through the use of a representative ratio between the various parts.

As an example, the high speed shaft 9 may be rotated at the rate of 3600 revolutions per minute in a clockwise direction. This power is transmitted to the medium speed master gear 27 through pinion 15, idler gear 17 and medium speed spur gear 22. As a result of the idler, the direction of travel of gear 22 is the same as high speed shaft 9 and medium speed master gear 27 of the differential unit moves therewith at a speed of say 213 revolutions per minute.

As this action is taking place, pinion 16 rotates differential internal ring gear 18 in a clockwise direction at a speed of say 214 revolutions per minute. This gear 18 rotates case 25 and idlers 33 and 34 at this speed as medium speed master gear is being rotated as above set forth. Thus, slow speed master gear 30 and its supporting shaft 28 receives the difference in speed of the two which is one revolution per minute in the direction of the fastest moving part, i. e., the case 25, which is moving in a clockwise direction at a speed of 214 revolutions per minute.

If the relative speed of gears 18 and 22, as they have been described herein, is interchanged, that is the speed of gear 22 set at 214 revolutions per minute, and that of gear 18 set at 213 revolutions per minute, the direction of travel of slow speed shaft 28 will be opposite in direction to the travel of shaft 23.

The number of teeth in gears 18 and 22 may be varied to change the speeds as set forth, and the amount of reduction varied over an unlimited range.

If desired, work may be taken off the medium speed shaft at the same time the low speed shaft is being used, and the ratio of speed established at any point.

What I claim and desire to secure by Letters Patent is:

1. A speed reducer comprising a supporting casing, a differential case rotatably carried thereby, a differential gear-set within said case including a pair of master gears disposed in axial alinement and each keyed to a shaft extending exteriorly of said differential case and rotatably mounted on said casing, a driven shaft mounted on said casing, means actuated by said driven shaft for rotating one of said master gear shafts in one direction at a slower rate of speed than said driven shaft, said means comprising an idler gear journalled in said casing, and means actuated by said driven shaft for rotating said differential case in the same direction at a higher rate of speed whereby the other of said master gears and associated shaft is rotated at a rate of speed equal to the difference in the rate of speed of said case and first-mentioned master gear and said reducer is provided with a medium and slow speed take-off shaft having rotation in the same directions.

2. A speed reducing unit comprising a main supporting casing, an inner differential casing having oppositely extending bearing trunnions journalled in the walls of said main casing, idler gear journalled in said inner casing, a pair of master gears in said inner casing in mesh with said idler gears, said master gears being carried by shafts rotatably carried in said trunnion bearings and extending through said main casing walls, an intermediate gear being carried by one of said shafts and between the walls of the main and inner casings, a driving shaft journalled in said main casing and extending parallel to said first named shafts, a ring gear on said inner casing and means for driving said ring gear and said intermediate gear from said driving shaft.

In testimony whereof I hereunto affix my signature.

DIXON E. WASHINGTON.